United States Patent [19]
Wilcock

[11] 3,795,829
[45] Mar. 5, 1974

[54] ELECTRICAL INFORMATION DELAY LINE

[75] Inventor: John David Wilcock, Weedon, England

[73] Assignee: Plessey Handel Und Investments A.G., Zug, Switzerland

[22] Filed: Sept. 21, 1972

[21] Appl. No.: 290,926

[30] Foreign Application Priority Data

Oct. 27, 1971 Great Britain .................. 49874/71

[52] U.S. Cl. ................................ 307/304, 307/251
[51] Int. Cl. ............................................ H03k 3/26
[58] Field of Search .... 307/205, 251, 221, 279, 304

[56] References Cited

UNITED STATES PATENTS

| | | | |
|---|---|---|---|
| 3,641,360 | 2/1972 | Yao | 307/279 |
| 3,644,750 | 2/1972 | Campbell | 307/251 |
| 3,638,036 | 1/1972 | Zimbelmann | 307/205 |
| 3,683,203 | 8/1972 | Smith | 307/279 |
| 3,676,711 | 7/1972 | Ahrons | 307/279 |

FOREIGN PATENTS OR APPLICATIONS

| | | | |
|---|---|---|---|
| 1,903,631 | 9/1969 | Germany | 307/279 |

OTHER PUBLICATIONS

Reynolds, "Metal Oxide Semiconductor Integrated Circuit," Post Off. Elec. Engrs. J. (GB), Vol. 63, pt. 2, July 1970, Pages 105–112

*Primary Examiner*—John W. Huckert
*Assistant Examiner*—R. E. Hart
*Attorney, Agent, or Firm*—Scrivener Parker Scrivener & Clarke

[57] ABSTRACT

An electrical delay line (preferably using metal oxide silicon transistors) in which storage stages alternate with temporary transfer stages, and a bit is progressed between stages by strobing inter-stage amplifiers by interlaced strobing pulses. Reversing links, e.g. from the last transfer stage to the first storage stage, can be operated once to reverse the sequence of bits present in the delay line. Two operations of the reversing links restore the original sequence.

4 Claims, 2 Drawing Figures

ELECTRICAL INFORMATION DELAY LINE

This invention relates to electrical information delay lines.

According to the invention there is provided an electrical information delay line comprising: an input terminal and an output terminal; a number of storage stages in which an information bit is stored in turn after presentation at the input terminal and before delivery at the output terminal; a transfer stage intermediate each pair of storage stages, in which a bit is temporarily stored during transfer from one storage stage of the pair to the other storage stage of the pair, and a further transfer stage intermediate the last of the storage stages and the output terminal; and reversing links each connecting a transfer stage to a storage stage, the links being simultaneously operable to transfer to the storage stages a sequence of bits temporarily stored in the transfer stages, the sequence of the bits after transfer to the storage stages being the reverse of that in the transfer stages.

An embodiment of the invention will now be described with reference to the accompanying drawings in which.

Figure 1:
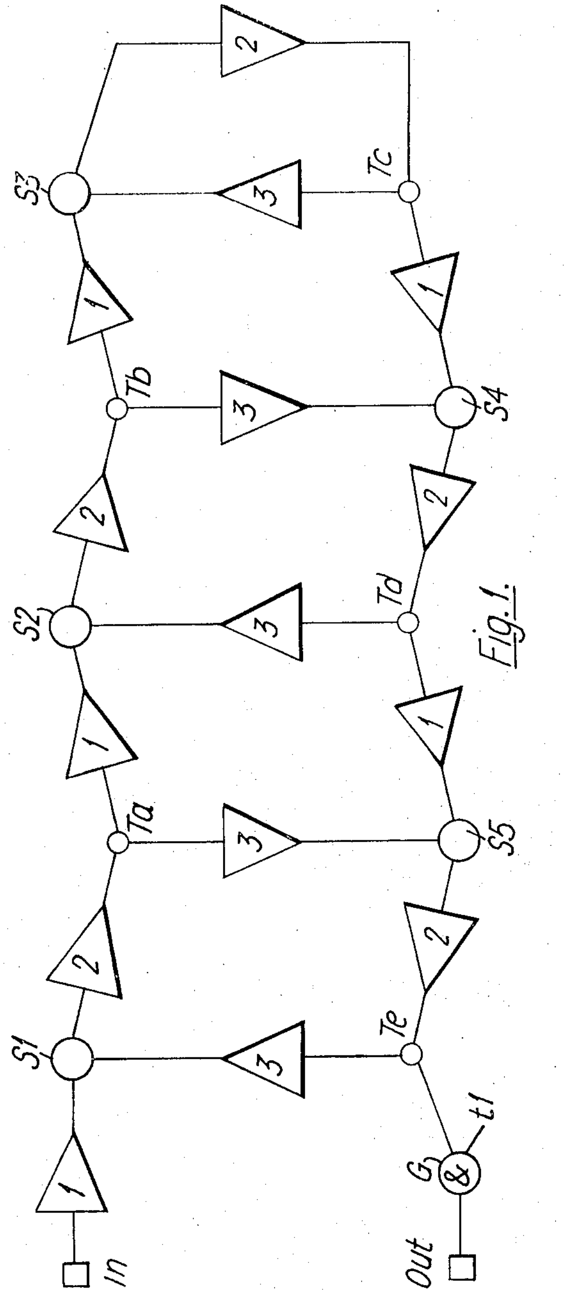
FIG. 1 illustrates the invention schematically.

In FIG. 1 a delay line comprises an input terminal IN, an output terminal OUT and five storage stages S1–S5. An information bit presented at the input terminal is passed through the five storage stages in turn before delivery at the output terminal. Between each pair of storage stages is a transfer stage, e.g. the transfer stage T*a* lies between the storage stages S1, S2 and so on. A further transfer stage T*e* lies between the storage stage S5 and the output terminal. A transfer store, e.g. T*b*, acts as a temporary store for an information bit during transfer of the bit from one, i.e. S2, to the other, i.e. S3, of the adjacent storage stages. Transfer of a bit from a storage stage to a transfer stage and from a transfer stage to a storage stage is effected by means of amplifiers, alternate amplifiers being strobed by pulses of one of two interlaced pulse trains. An amplifier is also provided between the input terminal and the storage stage S1. The amplifiers are depicted by triangles and operate in the direction base to apex. The numbers in the triangles indicate whether the amplifiers are strobed by pulses of the first or of the second of the two interlaced pulse trains. An AND gate G, which is strobed by pulses *t*1 of the first train, is provided between the last transfer stage T*e* and the output terminal, and serves to deliver the contents of the transfer stage T*e* at the output terminal. Thus the pulses *t*1 of the first train act to transfer bits (a) from the input terminal to the first storage stage S1, (b) from a transfer stage, e.g. T*b*, to a storage stage, e.g. S3, and (c) from the last transfer stage T*e* to the output terminal. The pulses *t*2 of the second train act to transfer bits (d) from a storage stage, e.g. S1, to a transfer stage, e.g. T*a*.

Reversing links are provided which include amplifiers strobed by a pulse *t*3. When a pulse *t*3 is applied, it is applied at the time of and instead of a pulse *t*1. Each reversing link runs from a transfer stage to a storage stage. The last transfer stage T*e* is connected to the first storage stage S1: the first transfer stage T*a* is connected to the last storage stage S5: the last-but-one transfer stage T*d* is connected to the second storage stage S2: and so on progressively to the mid-point of the delay line. The connections afforded by the reversing links serve two objects. Firstly they enable a sequence of information bits presented at the input terminal to be delivered in reverse order at the output terminal. Secondly they permit information bits to be stored in the delay line indefinitely. This will be apparent from the following description.

Suppose the information bits ABCDE are presented at the input terminal in that order. By applying pulses *t*1, *t*2 alternately, the information is advanced until the bits A–E are stored in the storage stages S5–S1. After the next pulse *t*2 the bits are stored in the transfer stages T*e* – T*a*. If the next pulse is a *t*1 pulse, the gate G opens, the bit A is delivered at the output terminal, and the bits B–E are transferred to the storage stages S5–S2. If however the *t*1 pulse is not applied and a *t*3 pulse is applied instead, the gate G does not open and the reversing links become operative. As a result, the bits A–E are transferred from the transfer stages T*e* – T*a* to the storage stages S1–S5. It will be noted that the sequence of bits has been reversed, and that whereas the bit A was previously the bit nearest the output terminal, the bit E is now the bit nearest to the output terminal. The next pulse being a *t*2 pulse, the bits E–A are transferred to the transfer stages T*e* – T*a*. If the following pulse is a *t*1 pulse, the bit E is delivered at the output terminal, and if *t*2, *t*1 pulses are thereafter applied alternately, the remaining bits are delivered in the order DCBA. In other words the substitution of a *t*1 pulse by a *t*3 pulse has caused the bit sequence to be reversed.

But if, instead of the *t*1 pulse which delivered a bit E at the output terminal, a second *t*3 pulse is applied, the bits E–A are transferred to the storage stages S1–S5, restoring the original conditions. That is to say, while the substitution of one *t*1 pulse by a *t*3 pulse, causes reversal of the bit sequence, the substitution of two *t*1 pulses in succession restores the original sequence. If now a third *t*3 pulse is applied, the effects of the first *t*3 pulse will be repeated, while a fourth *t*3 pulse will reproduce the effects of the second *t*3 pulse. Hence, if *t*3 pulses are substituted for an even number of successive *t*1 pulses, the bits of the stored information are circulated around closed loops provided by the reversing links. Thus the bits A, E circulate in opposite phase around the loop comprising the stages S1, T*a*, S5, T*e;* the bits B, D circulate in opposite phase around the loop comprising the stages S2, T*b*, S4, T*d;* the bit C alternates between the stages S3, T*c*. If the delay line had an even number of storage stages, the bit C would share a four-stage loop with another bit in the manner just described.

The gate G may be replaced by a strobed amplifier, provided that, if the amplifier changes the polarity of the signal which it amplifies, an inverter is provided to invert the polarity of the amplifier output. The reason for this requirement is apparent if one supposes that the amplifiers shown as triangles in FIG. 1 reverse the polarity of the signals they amplify. Suppose the delay line is worked by means of earth and negative potentials, and that the input terminal is normally at earth potential. Under these conditions, a bit to be stored in the delay line is presented at the input terminal, as negative potential. After pulse *t*1 the bit is stored in stage S1 as earth potential, and after pulse *t*2, in stage T*a* as negative potential. The bit progresses along the delay line and is eventually stored in stage T*e* as negative potential. If the amplifier that replaces the gate G changes this polarity and an inverter is not employed, the signal delivered at the output terminal will now be the signal that was applied to the input terminal.

Figure 2:
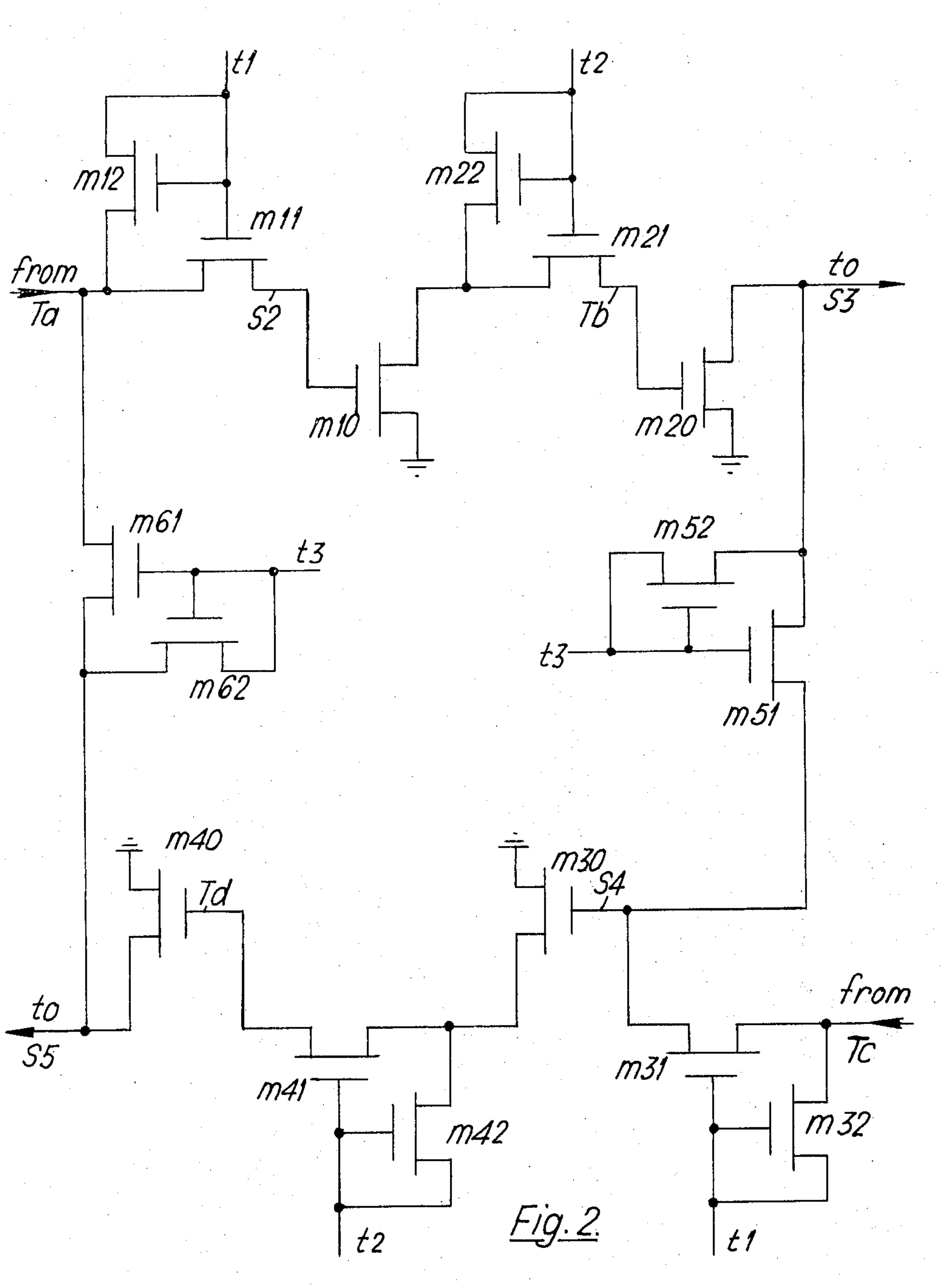
FIG. 2 is a circuit diagram showing part of a delay line according to the invention.

The delay line, part of which is shown in FIG. 2, employs metal-oxide-silicon transistors. The transistors *m*10, *m*20, *m*30, *m*40 correspond respectively to the stages S2, T*b*, S4, T*d* of FIG. 1. A bit is stored in the form of a potential at the gate of these transistors. The sources of these transistors are earthed, and their drains are their outlets. Transistors *m*11, *m*12 and *m*31, *m*32 serve as amplifiers strobed by *t*1 pulses, and control the inputs to the storage stages S2, S4 respectively. Transistors *m*21, *m*22 and *m*41, *m*42 serve as amplifiers strobed by *t*2 pulses, and control the inputs to the transfer stages T*b*, T*d* respectively. These transistors work in known fashion and the delay line works in the manner already mentioned.

A reversing link running from the transfer stage T*b* to the storage stage S4 is provided by transistor *m*51, which in conjunction with transistor *m*52 forms an amplifier strobed by a pulse *t*3. Another reversing link runs from the transfer stage T*d* to the storage stage S2 and is provided by transistor *m*61, which in conjunction with transistor *m*62 forms an amplifier strobed by a pulse *t*3. The reversing links operate as already described.

Preferably the delay line is accommodated on an integrated circuit chip.

It is to be understood that the foregoing description of specific examples of this invention is made by way of example only and is not to be considered as a limitation in its scope.

What is claimed is:

1. An electrical information delay line comprising:

an input terminal and an output terminal; a succession of storage stages in which an information bit is stored in turn after presentation at the input terminal and before delivery at the output terminal; a transfer stage intermediate each pair of storage stages, in which a bit is temporarily stored during transfer from one storage stage of the pair to the other storage stage of the pair, and a further transfer stage intermediate the last storage stage and the output terminal; and a progression of reversing links each connecting a transfer stage to a storage stage, the progression comprising a first link connecting the said further transfer stage to the first storage stage of the succession, a second link connecting the transfer stage succeeding the first storage stage to the last storage stage of the succession, a third link connecting the transfer stage preceding the last storage stage to the second storage stage of the succession, a fourth link connecting the transfer stage succeeding the second storage stage to the penultimate storage stage of the succession, and further links correspondingly connected until the progression reaches the mid-point of the delay line, the links being simultaneously operable to transfer to the storage stages a sequence of bits temporarily stored in the transfer stages, the sequence of the bits after transfer to the storage stages being the reverse of that in the transfer stages.

2. A delay line as claimed in claim 1 in which a storage stage comprises a metal oxide silicon transistor whose source is earthed and whose gate receives a potential indicative of the presence of an information bit; in which a transfer stage comprises a metal oxide silicon transistor whose source is earthed and whose gate receives a potential indicative of the presence of an information bit; and in which a reversing link includes an amplifier comprising a metal oxide silicon transistor whose source and drain are connected between relevant transfer and storage stages, and whose gate receives a strobing potential which operates the link.

3. A delay line as claimed in claim 1 in which a single operation of the reversing links reverses the sequence of information bits present in the delay line; and in which a single operation of the reversing links followed by a second operation thereof restores the original sequence.

4. A delay line as claimed in claim 1 which is accommodated on an integrated circuit chip.

* * * * *